US010752069B2

(12) United States Patent
Wall et al.

(10) Patent No.: US 10,752,069 B2
(45) Date of Patent: Aug. 25, 2020

(54) WRAP AROUND AXLE CONNECTION FOR SUSPENSION TRAILING ARM

(71) Applicant: REYCO GRANNING, LLC, Mt. Vernon, MO (US)

(72) Inventors: Kenneth Wall, Springfield, MO (US); Michael G. Ochse, Springfield, MO (US)

(73) Assignee: REYCO GRANNING, LLC, Mt. Vernon, MO (US)

( * ) Notice: Subject to any disclaimer, the term of this patent is extended or adjusted under 35 U.S.C. 154(b) by 0 days.

(21) Appl. No.: 15/584,945

(22) Filed: May 2, 2017

(65) Prior Publication Data

US 2017/0326933 A1 Nov. 16, 2017

Related U.S. Application Data

(60) Provisional application No. 62/334,297, filed on May 10, 2016.

(51) Int. Cl.
*B60G 9/00* (2006.01)

(52) U.S. Cl.
CPC .......... *B60G 9/003* (2013.01); *B60G 9/00* (2013.01); *B60G 9/006* (2013.01); *B60G 2200/31* (2013.01)

(58) Field of Classification Search
CPC ..... B60G 9/003; B60G 2200/31; B60G 9/006
See application file for complete search history.

(56) References Cited

U.S. PATENT DOCUMENTS

| 8,292,313 | B2 * | 10/2012 | Pierce | B60G 9/003 280/124.11 |
|---|---|---|---|---|
| 8,770,604 | B2 * | 7/2014 | Brereton | B60G 7/001 280/124.108 |
| 9,333,826 | B1 * | 5/2016 | Saieg | B60G 9/003 |
| 9,511,641 | B2 * | 12/2016 | Drewes | B60G 9/003 |
| 2007/0158924 | A1 * | 7/2007 | Peaker | B60G 7/001 280/124.116 |
| 2013/0181422 | A1 | 7/2013 | Eveley | |
| 2013/0228993 | A1 * | 9/2013 | Michel | B60G 5/06 280/124.116 |
| 2014/0070512 | A1 * | 3/2014 | Wilson | B60G 11/22 280/124.155 |

FOREIGN PATENT DOCUMENTS

| CA | 2960326 A1 | 3/2016 | | |
|---|---|---|---|---|
| DE | 10 2017 115692 | * | 7/2017 | B60G 9/02 |

OTHER PUBLICATIONS

Canadian Office Action from corresponding Canadian Patent Application No. 2,964,575, dated May 9, 2018.

* cited by examiner

*Primary Examiner* — Karen Beck
(74) *Attorney, Agent, or Firm* — Greer, Burns & Crain, Ltd.

(57) ABSTRACT

A vehicle suspension is provided, including an axle having an axle body with an exterior surface, a main trailing arm shell portion having a first axle engagement surface configured for engaging a first portion of the exterior surface, and a second trailing arm shell portion having a second axle engagement surface configured for engaging a second portion of the exterior surface. Upon assembly to the axle, the main trailing arm shell portion and the second trailing arm shell portion engage more than 180° of a curvature of the exterior surface.

16 Claims, 2 Drawing Sheets

WRAP AROUND AXLE CONNECTION FOR SUSPENSION TRAILING ARM

RELATED APPLICATION

This application claims priority under 35 USC 119 from U.S. Provisional Application No. 62/334,297 filed May 10, 2016.

BACKGROUND

The present invention relates generally to vehicle suspensions, and more specifically to such suspensions constructed and arranged for use with heavy duty vehicles such as trucks and trailers.

Conventional vehicle suspensions employ at least one round axle having an axle seat or trailing arm attached by placing the arm on one side of the axle and welding or bolting it in place. A portion of the seat or arm actually touching the axle is typically constructed in one piece or welded into essentially one piece. There is an interest on the part of designers and manufacturers of such suspensions for achieving a relatively stronger connection between the trailing arm and the axle.

SUMMARY

The above-listed needs are met or exceeded by the present wrap around axle connection for a suspension trailing arm, which features a connection with increased contact surface area between the trailing arm and the axle. In conventional suspensions, the seat or arm could not wrap around the axle more than 180° because the resulting mounting opening in the seat or arm would be less than the width of the axle. Thus, such an arm would not be able to fit around the target axle. A feature of the present wrap around axle connection is that the arm is provided in at least two segments, that, when assembled to the axle, result in a structure that encompasses greater than 180° of the circumference of the axle. This structure results in an appreciably stronger round axle suspension.

More specifically, the increased contact area and resulting increased weld area between the axle and trailing arm reduces stress on the attachment joint between the arm and the axle, thus making possible reduced component weight and cost. In the preferred embodiment, the present trailing arm includes a main portion of the trailing arm also referred to as the trailing arm shell, constructed and arranged for being placed on a first, preferably forward side of the axle, and wrapping partially around a top of the axle. A second, relatively smaller portion of the trailing arm is placed on the rearward side of the axle, and is secured to the main portion and to the axle, preferably by welding. This weld to the axle extends to the lowest part of the shell, and provides attachment to the axle below a horizontal midpoint, for enhanced connection between the trailing arm and the axle. In the preferred embodiment, the main and second portions are maintained in proper alignment during assembly using mating tabs and slots, or other irregular edge formations for achieving desired alignment.

As is common in trailing arm construction, a top plate is then secured to both the main and second portions, preferably by welding, or by other known fastening technologies such as rivets or threaded fasteners. Also as is common in suspension construction, the main portion is provided with a bushing housing, and the top plate is provided with at least one shock absorber bracket.

More specifically, a vehicle suspension is provided, including an axle having an axle body with an exterior surface, a main trailing arm shell portion having a first axle engagement surface configured for engaging a first portion of the exterior surface, and a second trailing arm shell portion having a second axle engagement surface configured for engaging a second portion of the exterior surface. Upon assembly to the axle, the main trailing arm shell portion and the second trailing arm shell portion engage more than 180° of a curvature of the exterior surface.

In another embodiment, a vehicle suspension trailing arm is provided for use with a vehicle suspension having an axle with a curved exterior surface, and includes a main trailing arm shell portion having a first axle engagement surface configured for engaging a first portion of the exterior surface, and a second trailing arm shell portion having a second axle engagement surface configured for engaging a second portion of the exterior surface. Upon assembly to the axle, the main trailing arm shell portion and the second trailing arm shell portion engage more than 180° of the exterior surface.

In the preferred embodiment, the axle exterior surface is circular when viewed in cross-section, and each of the first and second axle engagement surfaces are arcuate in shape to complement the exterior surface. In another embodiment, the first axle engagement surface extends over a greater portion of said axle exterior surface than said second axle engagement surface. In still another embodiment, the main trailing arm shell portion is longer in a direction transverse to the axle than the second trailing arm shell portion. It is also preferred that the main and second trailing arm shell portions have complementary mating alignment formations, such as a tab and slot configuration. Furthermore, it is contemplated that the main trailing arm shell portion is attached to, and extends from a front surface of the axle, and the second shell portion is secured to a rear surface of the axle. The main trailing arm shell portion and the second trailing arm shell portion are preferably secured to each other and to the axle, such as by welding or the like. Also a top plate is secured to at least one of the main trailing arm shell portion and the second trailing arm shell portion.

DETAILED DESCRIPTION

Figure 1:
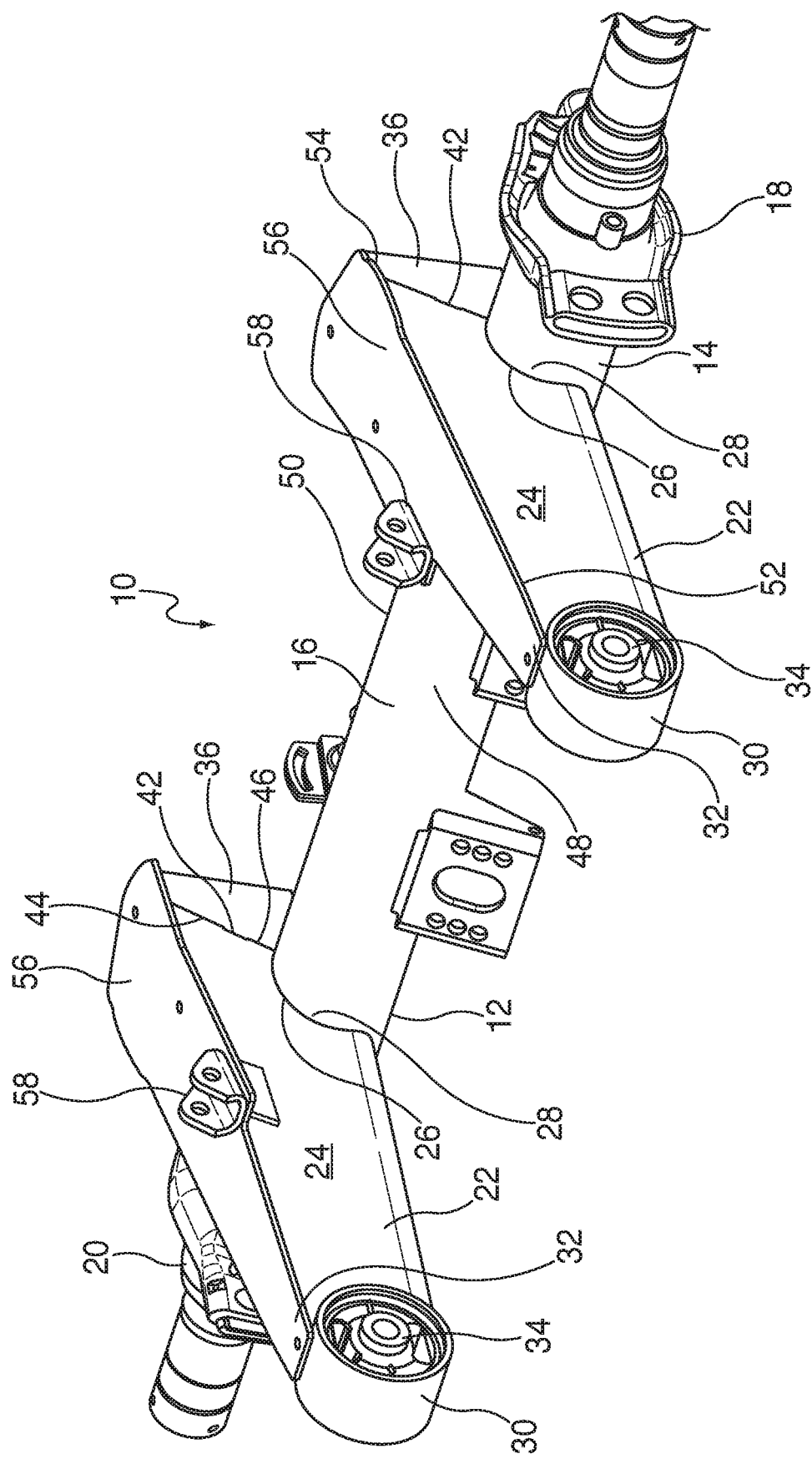
FIG. 1 is a fragmentary top perspective assembled view of the present axle assembly equipped with the present trailing arm.
Figure 2:
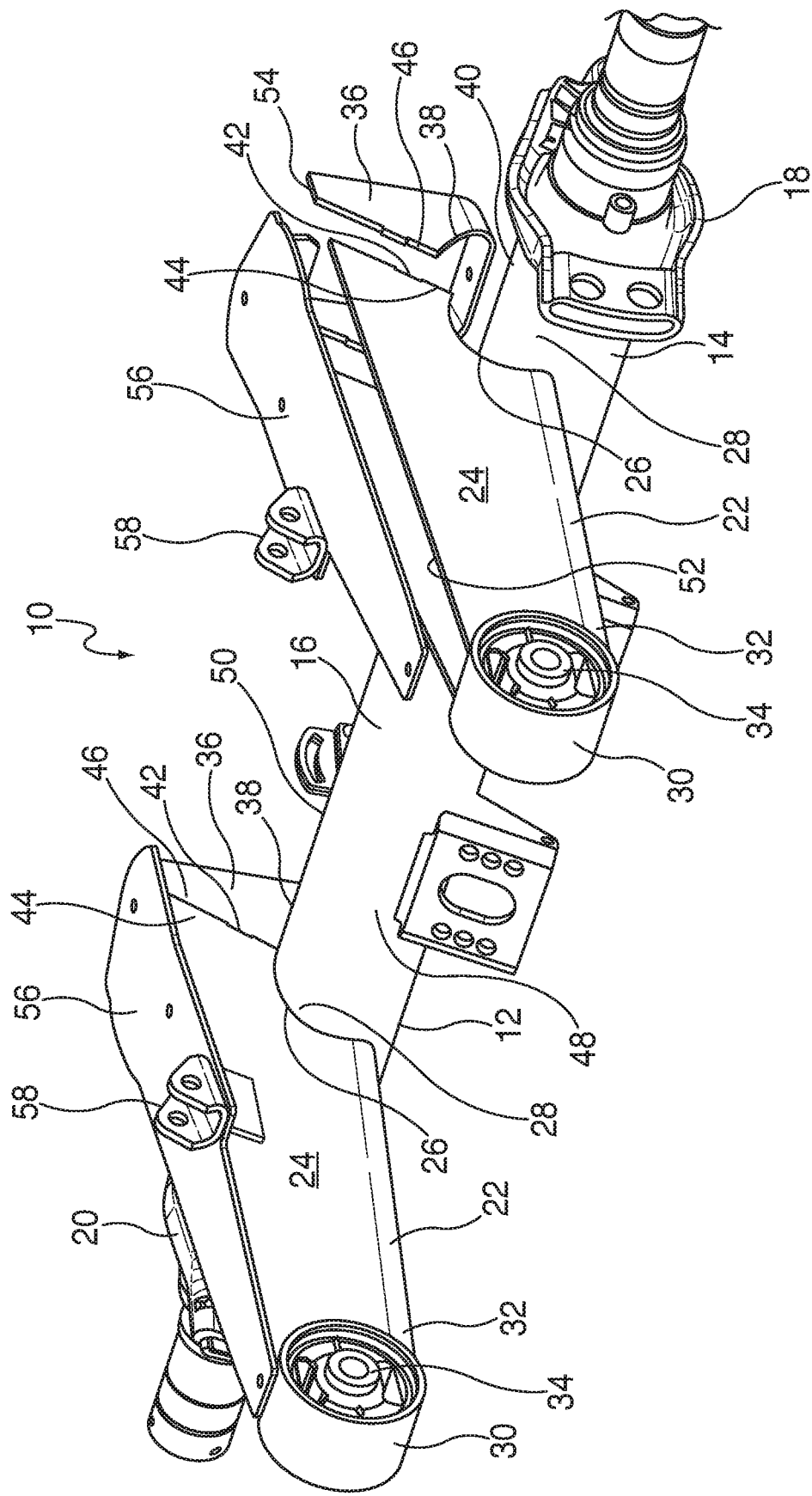
FIG. 2 is an exploded perspective view of the assembly of FIG. 1.

Referring now to FIGS. 1 and 2, a vehicle suspension is generally designated 10, and includes an axle 12 which is contemplated as being either the front or rear axle of a vehicle. In the present disclosure, a vehicle is broadly contemplated as being an automobile, truck, trailer or wheeled vehicles, whether self-propelled or towed. It is also contemplated that a full vehicle suspension includes components such as springs, struts and/or shock absorbers that are not shown here and are not considered relevant to the present disclosure.

The axle 12 has a body 14 with an exterior surface 16, which in the preferred embodiment is curved, and is preferably circular when viewed in transverse cross-section, however other shapes are contemplated depending on the application. First and second axle ends 18, 20 are configured for accommodating wheels, as is well known in the art.

A main feature of the present suspension 10 is that at least one and preferably a pair of trailing arms 22 are constructed and arranged to engage or contact a majority of the exterior surface 16 compared to conventional suspensions. In the preferred embodiment, the trailing arms 22 are mounted in spaced, parallel relation upon the axle 12.

As seen in FIGS. 1 and 2, each trailing arm 22 includes a main or first trailing arm shell portion 24 having a first axle engagement surface 26 configured for engaging a first portion 28 of the exterior surface 16. The main trailing arm shell portion 24 includes a bushing housing 30 located at a free end 32 opposite the first axle engagement surface 26. As is known in the art, the bushing housing 30 accommodates a bushing 34, the latter used for connecting associate suspension components such as springs, dampening rods or the like (not shown).

A second trailing arm shell portion 36 has a second axle engagement surface 38 configured for engaging a second portion 40 of the axle exterior surface 16. In the preferred embodiment, the axle exterior 16 is circular in cross-section as described above, and each of the first and second axle engagement surfaces 26, 38 are arcuate in shape or otherwise complementary to the exterior. While other configurations are contemplated, the main trailing arm shell portion 24 is longer in a direction transverse to the axle 12 than the second trailing arm shell portion 36. Also, in the preferred embodiment, the first axle engagement surface 26 extends over a greater portion of the axle exterior surface 16 than the second axle engagement surface 38.

Another feature of the present suspension 10 is that the main trailing arm shell portion 24 and the second trailing arm shell portion 36 are constructed and arranged to be secured to each other, and to the axle 12. In the preferred embodiment, the attachment is achieved by welding; however other suitable fastening technologies are contemplated, including rivets, threaded fasteners, chemical adhesives or the like. Attachment of the main and second trailing arm shell portions 24, 36 is preferably facilitated by complementary mating alignment formations 42, which may be provided in a variety of configurations. The purpose of the alignment formations 42 is to properly locate the main and second trailing arm shell portions 24, 36 to each other as they are attached to the axle 12. In the preferred embodiment, opposing edges 44, 46 of the trailing arm shell portions 24, 26 are provided with complementary tab and slot formations 42.

As seen in FIGS. 1 and 2, the main trailing arm shell portion 24 is secured to, and projects from a front surface 48 part of the exterior 16 of the axle 12, and the second trailing arm shell portion 36 is secured to a rear surface 50 of the axle exterior. A feature of the present suspension 10 is that upon assembly to the axle 12, the first shell portion 24 and the second shell portion 36 engage a majority of a circumference or peripheral edge of the exterior axle surface 16. In particular, the two shell portions 24, 36 contact more than 180° of a curvature of the exterior axle surface 16. More specifically, the present trailing arms 22 are secured to the axle exterior surface 16 more than 180° when viewed from one of the axle ends 18, 20.

Each of the main trailing arm shell portion 24 and the second trailing arm shell portion 36 have a corresponding upper edge 52, 54 constructed and arranged for receiving a top plate 56 which is secured to the shell portions by welding or similar fastening technology, as discussed above. The top plate is secured to at least one of the main and second trailing arm shell portions 24, 26. Also, as is known in the art, the top plate 56 is provided with at least one shock hanger bracket 58 to which is attached on end of a shock absorber (not shown). Further, the top plate 56 optionally supports the mounting of an air spring (not shown).

While a particular embodiment of the present wrap around axle connection for suspension trailing arm has been described herein, it will be appreciated by those skilled in the art that changes and modifications may be made thereto without departing from the invention in its broader aspects and as set forth in the following claims.

The invention claimed is:

1. A vehicle suspension, comprising:
an axle having an axle body with an exterior surface that surrounds the axle, wherein said exterior surface has a front surface and a rear surface;
at least one trailing arm secured to said axle body and having a longitudinal axis, said at least one trailing arm having a front end and a rear end and including a main trailing arm shell portion and a second trailing arm shell portion;
said main trailing arm shell portion extending from said front end of said at least one trailing arm to said axle body and having a first axle engagement surface attached to said front surface of said exterior surface of said axle body;
said second trailing arm shell portion extending from said rear end of said at least one trailing arm to said axle body and having a second axle engagement surface that is non-movably attached to said rear surface of said exterior surface of said axle body,
wherein said main trailing arm shell portion and said second trailing arm shell portion are arranged end-to-end along said longitudinal axis of said at least one trailing arm and are secured to each other;
upon assembly to said axle, said main trailing arm shell portion and said second trailing arm shell portion engaging more than 180° of a curvature of said exterior surface of said axle body and less than the entire exterior surface of said axle body.

2. The suspension of claim 1, wherein said axle exterior surface is circular when viewed in cross-section, and each said first and second axle engagement surfaces are arcuate in shape to complement said exterior surface.

3. The suspension of claim 1, wherein said first axle engagement surface extends over a greater portion of said axle exterior surface than said second axle engagement surface.

4. The suspension of claim 1, wherein said main trailing arm shell portion is longer in a direction transverse to said axle than said second trailing arm shell portion.

5. The suspension of claim 1, wherein said main and said second trailing arm shell portions have complementary mating alignment formations.

6. The suspension of claim 5, wherein said complementary mating alignment formations include a mating tab and slot on opposing surfaces of said main and second shell portions.

7. The suspension of claim 1, wherein said main trailing arm shell portion and said second trailing arm shell portion are secured to said axle body.

8. The suspension of claim 7, wherein said trailing arm portions and said axle body are welded together.

9. The suspension of claim 1 further including a top plate secured to at least one of said main trailing arm shell portion and said second trailing arm shell portion.

10. A vehicle suspension trailing arm for use with a vehicle suspension having an axle and an axle body with an exterior surface that surrounds the axle, the vehicle suspension trailing arm comprising:
- a main trailing arm shell portion having a first axle engagement surface attached to a front surface of the exterior surface;
- a second trailing arm shell portion having a second axle engagement surface that is non-movably attached to to a rear surface of the exterior surface, wherein the main trailing arm shell portion and the second trailing arm shell portion are secured to each other;
- upon assembly to said axle, said main trailing arm shell portion and said second trailing arm shell portion engaging more than 180° of the exterior surface and less than the entire exterior surface of said axle body.

11. The suspension of claim 10, wherein the axle exterior surface is circular when viewed in cross-section, and each said first and second axle engagement surfaces are arcuate in shape to complement the exterior surface.

12. The suspension of claim 10, wherein said first axle engagement surface extends over a greater portion of the axle exterior surface than said second axle engagement surface.

13. The suspension of claim 10, wherein said main trailing arm shell portion is longer in a direction transverse to the axle than said second trailing arm shell portion.

14. The suspension of claim 10, wherein said main and said second trailing arm shell portions have complementary mating alignment formations, including a mating tab and slot on opposing surfaces of said main and second shell portions.

15. The suspension of claim 10, wherein said main trailing arm shell portion and said second trailing aim shell portion are secured to each other and to the axle body.

16. The suspension of claim 10, further including a top plate secured to at least one of said main trailing arm shell portion and said second trailing arm shell portion.

* * * * *